US008788758B1

(12) United States Patent
de la Iglesia

(10) Patent No.: US 8,788,758 B1
(45) Date of Patent: Jul. 22, 2014

(54) LEAST PROFITABILITY USED CACHING SCHEME

(75) Inventor: Erik de la Iglesia, Sunnyvale, CA (US)

(73) Assignee: Violin Memory Inc, Santa Clara, CA (US)

( * ) Notice: Subject to any disclaimer, the term of this patent is extended or adjusted under 35 U.S.C. 154(b) by 706 days.

(21) Appl. No.: 13/005,463

(22) Filed: Jan. 12, 2011

Related U.S. Application Data

(63) Continuation-in-part of application No. 12/889,732, filed on Sep. 24, 2010, now Pat. No. 8,443,150, which is a continuation-in-part of application No. 12/814,438, filed on Jun. 12, 2010, which is a continuation-in-part of application No. 12/605,119, filed on Oct. 23, 2009, now Pat. No. 8,214,599, said application No. 12/814,438 is a continuation-in-part of application No. 12/605,160, filed on Oct. 23, 2009, now Pat. No. 8,214,608, said application No. 12/814,438 is a continuation-in-part of application No. 12/684,387, filed on Jan. 8, 2010.

(60) Provisional application No. 61/218,821, filed on Jun. 19, 2009, provisional application No. 61/111,304, filed on Nov. 4, 2008, provisional application No. 61/111,310, filed on Nov. 4, 2008, provisional application No. 61/144,404, filed on Jan. 13, 2009.

(51) Int. Cl.
*G06F 12/02* (2006.01)

(52) U.S. Cl.
USPC ............................ 711/136; 711/154; 711/156

(58) Field of Classification Search
USPC .......................................... 711/136, 154, 156
See application file for complete search history.

(56) References Cited

U.S. PATENT DOCUMENTS

| | | | |
|---|---|---|---|
| 5,588,136 A * | 12/1996 | Watanabe ...................... | 711/160 |
| 5,809,528 A * | 9/1998 | Miller et al. ................... | 711/136 |
| 5,954,796 A | 9/1999 | McCarthy et al. | |
| 6,041,366 A | 3/2000 | Maddalozzo et al. | |
| 6,272,595 B1 * | 8/2001 | Rosen et al. ................... | 711/128 |
| 6,401,147 B1 | 6/2002 | Sang et al. | |
| 6,636,982 B1 | 10/2003 | Rowlands | |
| 6,678,795 B1 | 1/2004 | Moreno et al. | |
| 6,718,439 B1 * | 4/2004 | Jayavant ....................... | 711/136 |
| 6,721,870 B1 | 4/2004 | Arnan et al. | |
| 6,742,084 B1 | 5/2004 | Defouw et al. | |
| 6,789,171 B2 | 9/2004 | Desai et al. | |
| 6,810,470 B1 | 10/2004 | Wiseman et al. | |
| 6,961,835 B2 * | 11/2005 | Lightstone et al. ........... | 711/171 |
| 7,017,084 B2 | 3/2006 | Ng et al. | |
| 7,089,370 B2 | 8/2006 | Luick | |
| 7,110,359 B1 | 9/2006 | Acharya | |
| 7,856,533 B2 | 12/2010 | Hur et al. | |
| 7,870,351 B2 | 1/2011 | Resnick | |

(Continued)

*Primary Examiner* — Stephen Elmore
(74) *Attorney, Agent, or Firm* — Brinks Gilson and Lione

(57) ABSTRACT

A storage proxy loads cache lines with data from a storage device. Storage access requests are received from an initiator and directed to the storage device. The storage proxy provides the data from the cache lines in response to cache hits on the cache lines, and provides the data from the storage device in response to cache misses on the cache lines. Hit access times are identified for the cache lines in response to the cache hits and miss access times are identified for the storage device in response to cache misses. Data in the cache lines is updated with data from the storage device based on the hit access times and the miss access times associated with the cache lines.

25 Claims, 8 Drawing Sheets

(56) References Cited

U.S. PATENT DOCUMENTS

| | | |
|---|---|---|
| 7,873,619 B1 | 1/2011 | Faibish et al. |
| 7,975,108 B1 | 7/2011 | Holscher et al. |
| 8,010,485 B1 | 8/2011 | Chatterjee et al. |
| 2002/0035655 A1 | 3/2002 | Finn et al. |
| 2002/0175998 A1 | 11/2002 | Hoang |
| 2002/0194434 A1 | 12/2002 | Kurasugi |
| 2003/0012204 A1 | 1/2003 | Czeiger et al. |
| 2003/0167327 A1 | 9/2003 | Baldwin et al. |
| 2003/0177168 A1 | 9/2003 | Heitman et al. |
| 2003/0210248 A1 | 11/2003 | Wyatt |
| 2004/0128363 A1 | 7/2004 | Yamagami et al. |
| 2004/0146046 A1 | 7/2004 | Jo et al. |
| 2004/0186945 A1 | 9/2004 | Jeter et al. |
| 2004/0215923 A1 | 10/2004 | Royer |
| 2005/0025075 A1 | 2/2005 | Dutt et al. |
| 2005/0195736 A1 | 9/2005 | Matsuda |
| 2006/0005074 A1 | 1/2006 | Yanai et al. |
| 2006/0034302 A1 | 2/2006 | Peterson |
| 2006/0053263 A1 | 3/2006 | Prahlad et al. |
| 2006/0075191 A1 | 4/2006 | Lolayekar et al. |
| 2006/0112232 A1 | 5/2006 | Zohar et al. |
| 2006/0212524 A1 | 9/2006 | Wu et al. |
| 2006/0218389 A1 | 9/2006 | Li et al. |
| 2006/0277329 A1 | 12/2006 | Paulson et al. |
| 2007/0050548 A1 | 3/2007 | Bali et al. |
| 2007/0079105 A1 | 4/2007 | Thompson |
| 2007/0118710 A1 | 5/2007 | Yamakawa et al. |
| 2007/0124407 A1 | 5/2007 | Weber et al. |
| 2007/0192444 A1 | 8/2007 | Ackaouy et al. |
| 2007/0233700 A1 | 10/2007 | Tomonaga |
| 2007/0283086 A1 | 12/2007 | Bates |
| 2008/0028162 A1 | 1/2008 | Thompson |
| 2008/0098173 A1 | 4/2008 | Chidambaran et al. |
| 2008/0104363 A1 | 5/2008 | Raj et al. |
| 2008/0162864 A1 | 7/2008 | Sugumar et al. |
| 2008/0215827 A1 | 9/2008 | Pepper |
| 2008/0215834 A1 | 9/2008 | Dumitru et al. |
| 2008/0250195 A1 | 10/2008 | Chow et al. |
| 2008/0320269 A1 | 12/2008 | Houlihan et al. |
| 2009/0006725 A1 | 1/2009 | Ito et al. |
| 2009/0006745 A1 | 1/2009 | Cavallo et al. |
| 2009/0034377 A1 | 2/2009 | English et al. |
| 2009/0110000 A1 | 4/2009 | Brorup |
| 2009/0240873 A1 | 9/2009 | Yu et al. |
| 2009/0259800 A1 | 10/2009 | Kilzer et al. |
| 2009/0262741 A1 | 10/2009 | Jungck et al. |
| 2009/0276588 A1 | 11/2009 | Murase |
| 2009/0307388 A1 | 12/2009 | Tchapda |
| 2010/0011154 A1 | 1/2010 | Yeh |
| 2010/0030809 A1 | 2/2010 | Nath |
| 2010/0080237 A1 | 4/2010 | Dai et al. |
| 2010/0088469 A1 | 4/2010 | Motonaga et al. |
| 2010/0115206 A1 | 5/2010 | de la Iglesia et al. |
| 2010/0115211 A1 | 5/2010 | de la Iglesia et al. |
| 2010/0122020 A1 | 5/2010 | Sikdar et al. |
| 2010/0125857 A1 | 5/2010 | Dommeti et al. |
| 2010/0169544 A1 | 7/2010 | Eom et al. |
| 2010/0174939 A1 | 7/2010 | Vexler |
| 2010/0250857 A1* | 9/2010 | Matsui .................. 711/133 |
| 2011/0047347 A1 | 2/2011 | Li et al. |
| 2011/0258362 A1 | 10/2011 | Mclaren et al. |
| 2012/0198176 A1 | 8/2012 | Hooker et al. |

\* cited by examiner

LEAST PROFITABILITY USED CACHING SCHEME

This application is a continuation in part of U.S. patent application Ser. No. 12/889,732 filed on Sep. 24, 2010 which is a continuation in part of U.S. patent application Ser. No. 12/814,438 filed on Jun. 12, 2010 which claims priority to U.S. provisional patent application Ser. No. 61/218,821 filed on Jun. 19, 2009 which are all incorporated by reference in their entirety. This application is also a continuation in part of U.S. patent application Ser. No. 12/605,119 filed on Oct. 23, 2009 that claims priority to provisional patent application Ser. No. 61/111,304 filed on Nov. 4, 2008 which are both herein incorporated by reference in their entirety. This application is also a continuation in part of U.S. patent application Ser. No. 12/605,160 filed Oct. 23, 2009, that claims priority to U.S. provisional patent application Ser. No. 61/111,310 filed on Nov. 4, 2008 which are both herein incorporated by reference in their entirety. This application is also a continuation in part of U.S. patent application Ser. No. 12/684,387 filed Jan. 8, 2010 that claims priority to U.S. provisional patent application Ser. No. 61/144,404 filed on Jan. 13, 2009 which are both herein incorporated by reference in their entirety.

BACKGROUND

A computer system may copy data from a storage device into a cache memory. Memory access times may be reduced when storage requests by the computer system are serviced from the faster cache memory. When the cache fills up, the computer system may invalidate data in some cache lines and repopulate the cache lines with other data from the slower storage device.

Different criteria may be used for replacing data in the cache lines. For example, the cache may use a least recently used (LRU) scheme that replaces data in the least recently accessed cache lines with data recently accessed data from the storage device. In another example, the cache may use a least frequently used (LFU) scheme that replaces data in the cache lines with the fewest number of accesses with the data recently accessed from the storage device. Some memory systems may use a combination of the LRU scheme and the LFU scheme. Derivative systems (such as ARC) have been used to improve the effectiveness of caching in storage systems.

The LRU scheme and/or the LFU scheme still may not provide the most efficient and/or effective replacement of data in the cache. For example, a first set of data may be invalidated in the cache while a second set of data in the cache remains valid. The computer system may then request the first set of data while the second set of data remains unused in the cache. The computer system may experience slower memory access times since the first set of data now has to be accessed from the slower storage device. Additionally, the presence of multiple layers of cache at different levels of hierarchy can cause inefficiencies and unforeseen interactions.

DETAILED DESCRIPTION

Figure 1:
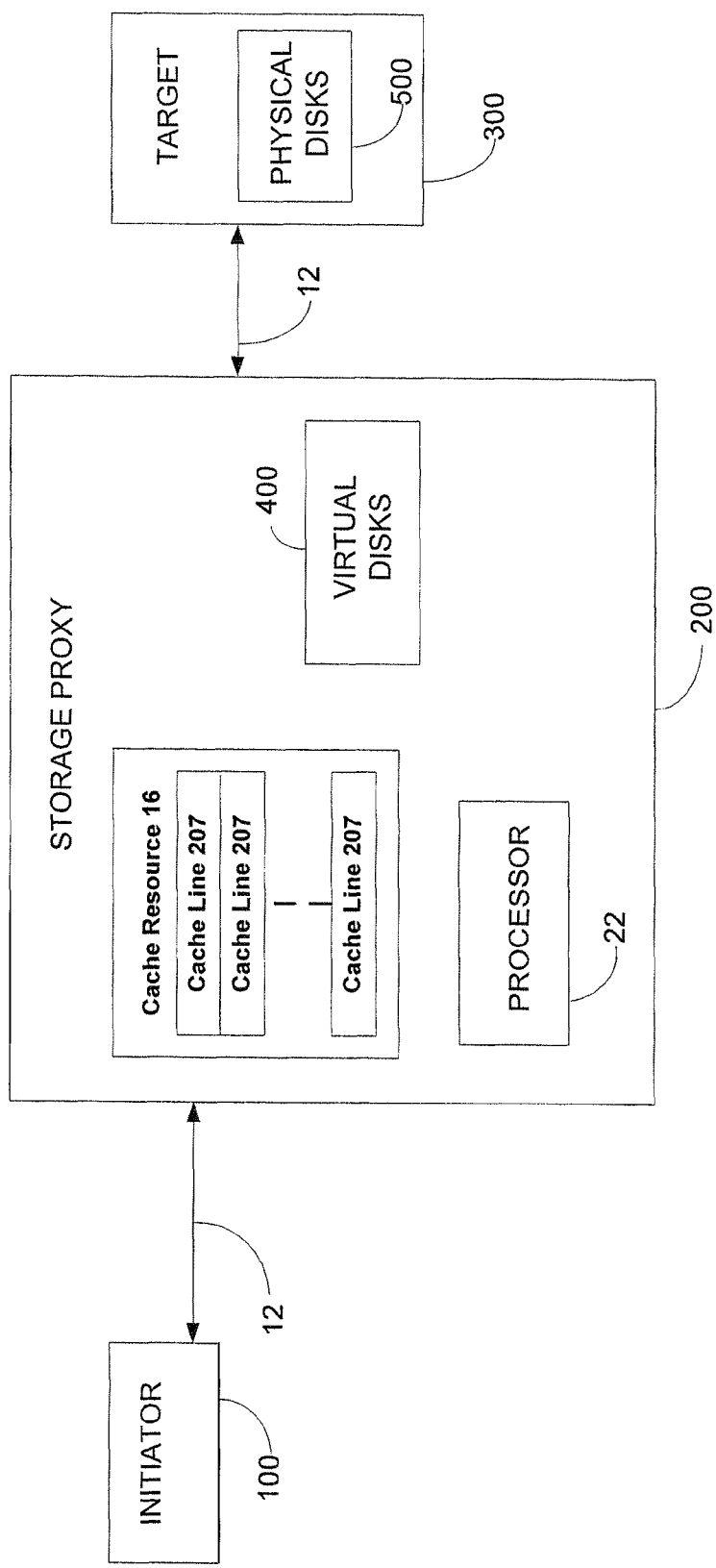
FIG. 1 depicts an example of a storage proxy.

FIG. 1 shows a storage proxy 200 deployed between an initiator 100 and a target 300. The initiator 100, storage proxy 200, and/or target 300 may be directly connected together, or connected to each other through a network or fabric. In one example, the initiator 100, storage proxy 200, and/or target 300 are coupled to each other via wired or wireless Internet connections 12.

The initiator 100 can be any device or application that writes and/or reads data to and from another device. For example, the initiator 100 may comprise one or more servers, server applications, database applications, routers, switches, client computers, personal computers, Personal Digital Assistants (PDA), smart phones, or any other wired or wireless computing device and/or software that accesses data in target 300.

In another example, the initiator 100 may comprise stand-alone appliances, devices, or blades, and the target 300 may comprise a stand-alone storage array. In other example, the initiator 100 may be a processor or software application in a personal computer or server that accesses one or more targets 300 over an internal or external data bus.

Target 300 may be any device that stores data accessed by another device, application, software, initiator, or the like, or any combination thereof. In some embodiments, the target 300 may comprise storage devices or storage servers that contain storage media such as solid state memory and/or storage disks. In one example, target 300 may contain multiple physical disks 500 that may be referred to generally as a disk array. In another example, target 300 may be located in a personal computer or server, or may be a stand-alone device coupled to the initiator 100 via a computer bus or packet switched network connection.

Physical disks 500 may exist locally within the same physical enclosure as storage proxy 200, within a same enclosure with other targets 300, or may exist externally in a chassis connected to target 300 and/or storage proxy 200 through some interconnect mechanism.

Storage proxy 200 may be any hardware and/or software located in a storage appliance, wireless or wired router, gateway, firewall, switch, computer processing system, or the like, or any combination thereof. In one embodiment, physical disks 500 in target 300 may be virtualized by storage proxy 200 as virtual disks 400.

The virtual disks 400 may comprise memory, buffers, registers, or the like, or any combination thereof and may provide an abstraction of physical disks 500 in target 300. In one example, the virtual disks 400 may be associated with different capacities and performance capabilities than the physical disks 500.

The virtual disks 400 may present the physical disks 500 to the initiator 100, receive an address from the initiator 100, and provide an associated address for accessing physical disks 500. In one embodiment, the physical disks 500 and the virtual disks 400 may be identical in size and configuration. In other embodiments the virtual disks 400 could consist of stripes of data or volumes of data that extend across multiple different physical disks 500. Such an embodiment would be most amenable to a tiering solution wherein portions of physical disks 500 are tiered within storage proxy 200.

In yet another example, virtual disks 400 may be presentations of existing virtual disks within target 300 such that initiator 100 accessing virtual disks 400 is served data from either virtual disks 400, disks controlled by target 300, and/or any other physical memory devices that may be accessed internally or externally by storage proxy 200. In such a configuration, data served by virtual disks 400 within storage proxy 200 may be expected to have lower latency or higher throughput, thereby demonstrating the rationale for deploying storage proxy 200. Data served from storage proxy 200 would in this embodiment reside within subsequently described cache resource 16.

Different communication protocols can be used over connections 12 between initiator 100 and target 300. Typical protocols include Fibre Channel Protocol (FCP), Small Computer System Interface (SCSI), Advanced Technology Attachment (ATA) and encapsulated protocols such as Fibre Channel over Ethernet (FCoE), Internet Small Computer System Interface (ISCSI), Fibre Channel over Internet Protocol (FCIP), ATA over Ethernet (AoE), or the like, or any combination thereof.

The initiator 100 may conduct different storage operations with the physical disks 500 in target 300 though the storage proxy 200. The storage operations may include write operations and read operations that have associated storage addresses. These interactions with storage proxy 200 and other components of storage proxy 200 may be normalized to block-level operations such as "reads" and "writes" of an arbitrary number of blocks.

Storage proxy 200 may include a cache resource 16 configured to accelerate accesses associated with target 300. The cache resource 16 may include an array of cache lines 207 that comprise cache memory for storing copies of data from physical disks 500, registers, and logic that maintain state for the different cache lines 207. The memory associated with cache lines 207 could be implemented with any memory device that provides relatively faster data access than the physical disks 500. For example, the memory in cache resource 16 may be any combination of Dynamic Random Access Memory (DRAM) and/or Flash memory. However, other types of relatively faster memory could also be used. The physical disks 500 may be any combination of flash memory, rotating disk devices, integrated memory devices, or the like, or any combination thereof.

A processor 22 may control cache resource 16. During a read operation from initiator 100, processor 22 may read data from target 300, supply the data to initiator 100, and store the data in cache resource 16. If subsequent read operations from initiator 100 request the same data, storage proxy 200 returns the data directly from cache resource 16 instead of from target 300. Such a direct return is referred to as a "cache hit" and reduces the read access time for providing data to initiator 100. For example, a memory access to target 300 may take several milliseconds (ms) while a memory access to cache resource 16 may be in the order of microseconds (μs).

Figure 2:
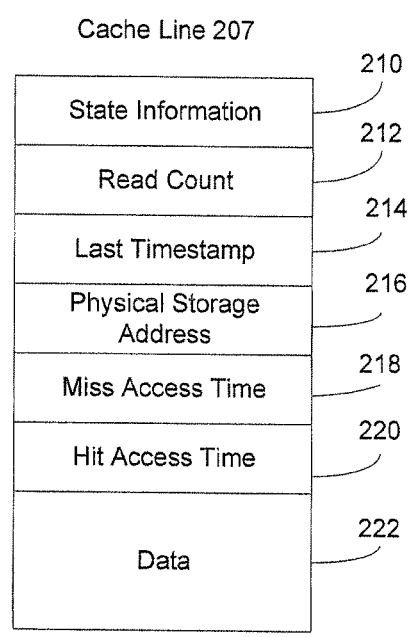
FIG. 2 depicts an example of contents contained in a cache line.

FIG. 2 shows in more detail some of the information contained in one of the cache lines 207. The information in the cache lines 207 may be stored in memory, registers, buffers, or the like, or any combination thereof. State information 210 identifies a current state of the cache line 207. For example, the cache line 207 may be identified in state information 210 as valid, invalid, or previously valid. A read count value 212 may indicate how many times the data in cache line 207 is read over some predetermined time period.

A last timestamp value 214 may indicate the last time the data in cache line 207 was read. A physical storage address 216 may identify a location in physical disks 500 where the data 222 in cache line 207 is also located. Contiguous cache lines 207 may contain contiguous blocks of data from target 300. Therefore, the physical storage address 216 may not be needed for each individual cache line 207.

A miss access time 218 may identify an amount of time associated with a cache miss and hit access time 220 may indicate an amount of time associated with a cache miss. For example, initiator 100 may send a read request to storage proxy 200 having an associated address. The processor 22 in storage proxy 200 may determine if the address for the read request corresponds with a physical storage address 216 in one of the cache lines 207 in cache resource 16.

A cache hit may refer to the address in the read request corresponding to the physical storage address 216 in one of the cache lines 207 and a cache miss refers to the address in the read request not corresponding to the physical storage address 216 in any of the cache lines 207 of the cache resource 16.

The processor 22 may provide data from the typically faster cache resource 16 for a cache hit and the processor 22 may provide data from the typically slower physical disks 500 for a cache miss. The miss access time 218 is associated with an amount of time required to supply data from physical disks 500 to the initiator 100 in response to a cache miss. The hit access time 220 is associated with an amount of time required to supply the data from cache resource 16 to the initiator 100 in response to a cache hit.

Figures 3A, 3B:
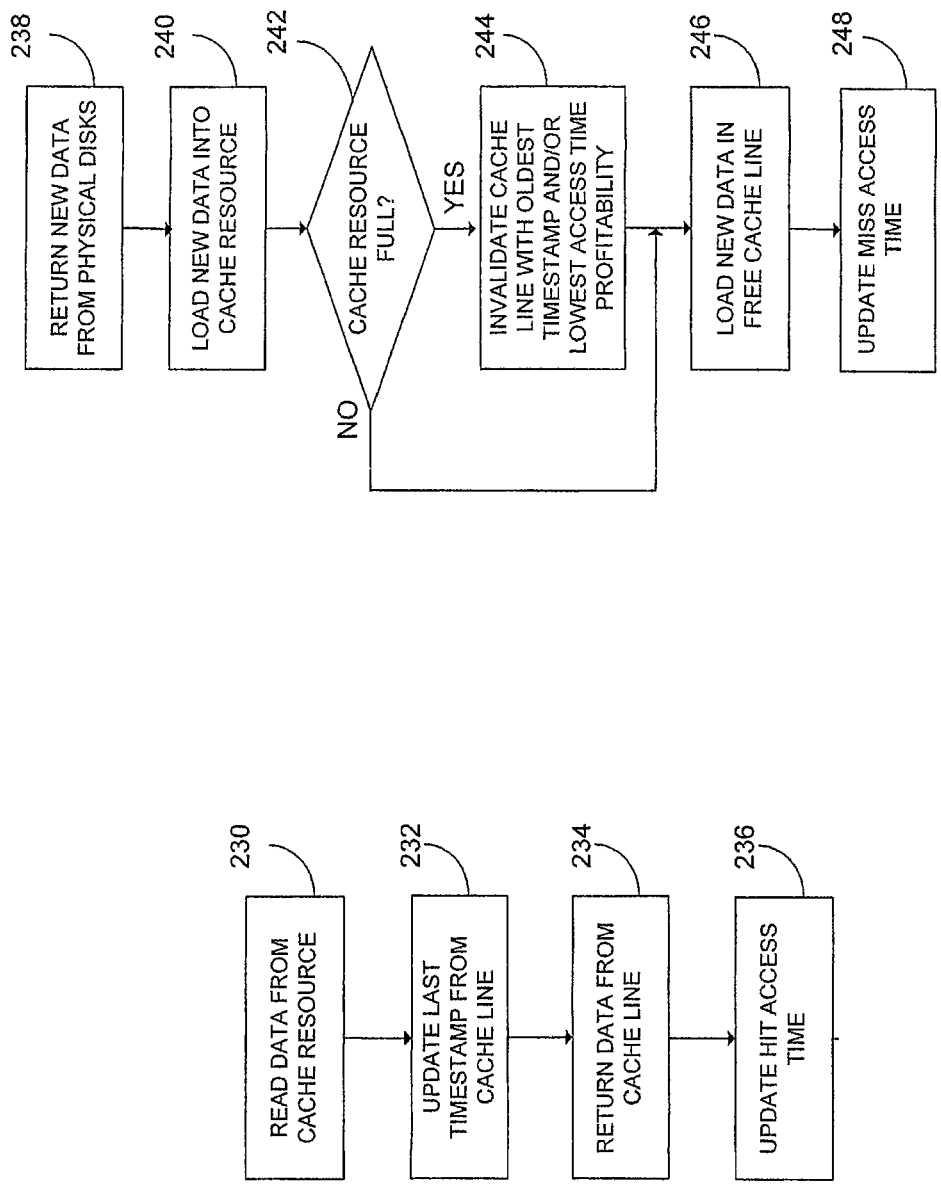
FIGS. 3A and 3B depict examples of a process for performing a least recently used caching scheme.

FIGS. 3A and 3B depict examples of a least recently used (LRU) scheme and/or access time least profitability used (LPU) scheme for updating data in the cache resource 16 of FIGS. 1 and 2. Referring to FIG. 3A, the storage proxy 200 in operation 230 may read data from one of the cache lines 207 in the cache resource 16. For example, storage proxy 200 may receive a read request from the initiator 100 and determine that the address associated with the read request matches one of the physical storage addresses 216 for one of the cache lines 207.

The storage proxy 200 may read the data from the corresponding cache line 207 in operation 230 and may update the last timestamp value 214 for the cache line 207 in operation 232. For example, the storage proxy may reset a counter to zero indicating the cache line was just read. Storage proxy 200 may return the data from the corresponding cache line 207 to the initiator 100 in operation 234 and update hit access time 220 in operation 236. For example, the storage proxy 200 may determine an amount of time required to read the data 222 from the cache line 207 and update the hit access time 220 with the identified time period.

Referring to FIG. 3B, the storage proxy 200 may add and/or replace data in the cache resource 16 based on the LRU and/or access time least profitability used (LPU) scheme. For example, the storage proxy 200 may receive another read request from the initiator 100 containing an address that is not associated with the physical storage address 216 in any of the cache lines 207 in cache resource 16. The storage proxy 200 may read the new data from one of the physical disks 500 in target 300 associated with the read address and return the new data to the initiator 100 in operation 238.

In one example, the storage proxy in operation 240 may also load the data read from the physical disk into cache resource 16. When cache resource 16 is not full or not near full in operation 242, storage proxy 200 may identify one of the unused cache lines 207 according to state information 210, load the new data into the identified cache line 207, and change the state information for the cache line to valid.

Storage proxy 200 in operation 242 may determine that the cache resource 16 is full or near full. For example, storage proxy 200 may determine from the state information 210 that all or most of the cache lines 207 in the cache resource 16 are currently being used for storing valid data. When the cache resource 16 is full or close to being full in operation 242, storage proxy 200 may invalidate one or more of cache lines 207 with the oldest timestamp values and/or lowest access time profitability in operation 244.

For example, the storage proxy 200 may invalidate one of the cache lines 207 not accessed in the cache resource 16 for the longest period of time. In another example, the storage proxy 200 may alternatively, or in addition, invalidate the cache line 207 with a lowest access time profitability value. The access time profitability values may be derived according to the miss access time 218 and/or hit access time 220 associated with each cache line 207. Examples of how a lowest access time profitability value is determined are discussed in more detail below in FIG. 9.

The access time profitability values may be used independently or may be used in combination with the last timestamp values to determine which cache lines 207 to evict/invalidate in operation 244. For example, an overall score may be assigned to each of the cache lines according to the last timestamp value and the access time profitability value and the cache lines may be selected for invalidation based on the overall scores.

In operation 246, the storage proxy 200 may load the new data from the physical disks 500 into the invalidated cache line and set the valid flag to indicate the cache line is now valid. The storage proxy 200 may reset the read count for the cache line to zero, reset the last timestamp counter to zero, and load a physical storage address into the cache line identifying where the data is located in the physical disks 500. In operation 248, the storage proxy 200 may also update the miss access time 218 for the cache line 207. For example, the storage proxy 200 identifies the amount of time was required to read the new data from the physical disks 500 and use the identified time period to update miss access time 218.

Figure 4B:
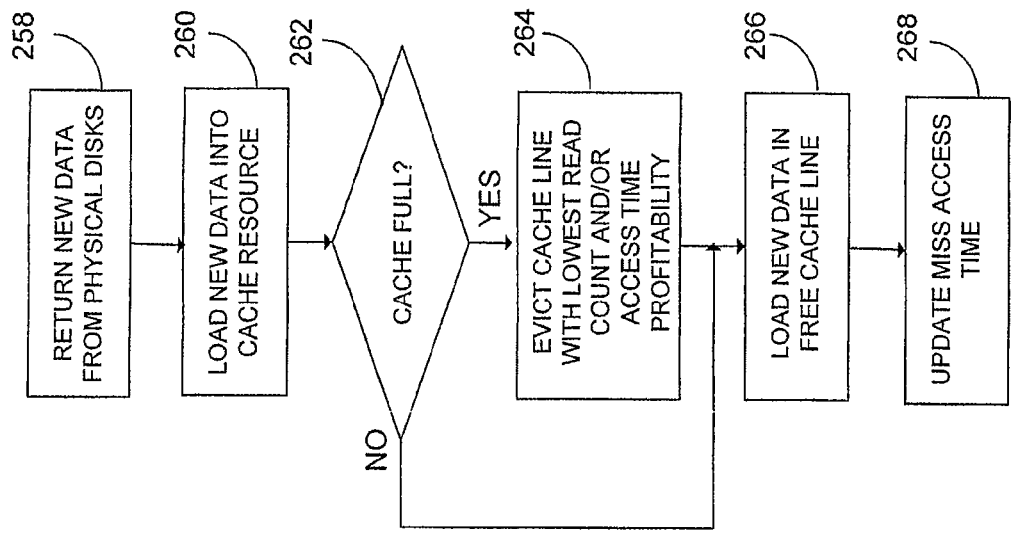
FIGS. 4A and 4B depict examples of a process for performing a least frequently used caching scheme.
Figure 4A:
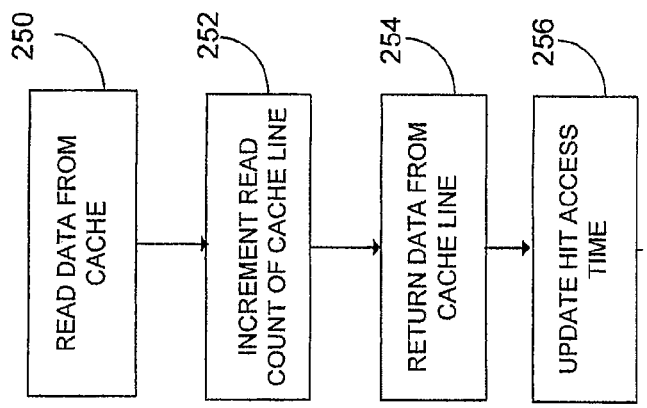

FIGS. 4A and 4B depict examples of a process for replacing data in the cache resource 16 based on a least frequently used scheme and/or the access time least profitability used (LPU) scheme. Referring to FIG. 4A, the storage proxy in operation 250 may read data from one of the cache lines. For example, the storage proxy may receive a read operation from the initiator 100 and determine that the address associated with the read operation matches one of the physical storage addresses 216 for one of the cache lines 207.

The storage proxy may read the data from the corresponding cache line in operation 250 and may increment the read count 212 associated with the cache line in operation 252.

For example, the storage proxy 200 may increment a counter associated with the cache line indicating a number of times the cache line has been read over a given time period. In operation 254, the storage proxy 200 may return the data from the cache line to the initiator 100 and in operation 256 may update the hit access time for the corresponding cache line 207.

Referring to FIG. 4B, storage proxy 200 may replace data in one or more cache lines 207 based on the LFU scheme and/or access time least profitability used (LPU) scheme. For example, the storage proxy 200 may receive a read request from the initiator 100 having an address not currently associated with any of the cache line 207 in cache resource 16. The storage proxy 200 may read the data from one of the physical disks 500 and return the new data to the initiator 100 in operation 258. In one example, the storage proxy 200 in operation 260 also loads the new data from the physical disk 500 into the cache resource 16.

In operation 262, the storage proxy 200 may determine if the cache resource is full. For example, storage proxy 200 in operation 262 may determine from the state information that at least one of the cache lines 207 in the cache resource 16 is invalid or unused. Storage proxy 200 in operation 266 may load the new data into one of the invalid or unused cache lines 207, and in operation 268 may change the state information 210 for the cache line to valid and update the miss access time 218.

The storage proxy 200 may determine that the cache resource 16 is full or near full in operation 262. In operation 264, the storage proxy 200 may invalidate the data in one or more of the cache lines 207 with the lowest read counts and/or lowest access time profitability. For example, storage proxy 200 may identify a cache line having a lowest read count over a particular time period and set an invalid flag in the state information 210 associated with the identified cache line. In another example, storage proxy 200 may identify a cache line having a lowest access time profitability value and set an invalid flag in the state information 210 associated with the identified cache line.

The access time profitability values may be used independently of the read count values or may be combined and/or weighted with the read count values to determine an overall value for the cache lines 207. Storage proxy 200 may then use the overall values to determine which cache lines to evict in operation 264.

In operation 266, the storage proxy may load the new data into the identified cache line 207 and set the valid flag to indicate the cache line is now valid. Storage proxy 200 in operation 268 may then reset read count 212, reset last time stamp counter 214, update the physical storage address 216 to the address in physical disks 500 containing the new data, and update the miss access time 218. For example, storage proxy 200 may identify an amount of time required to read the new data from physical disks 500.

It should also be understood that any combination of the LRU, LFU, and/or least access time profitability schemes may be used to replace data in cache resource 16.

Figure 5:
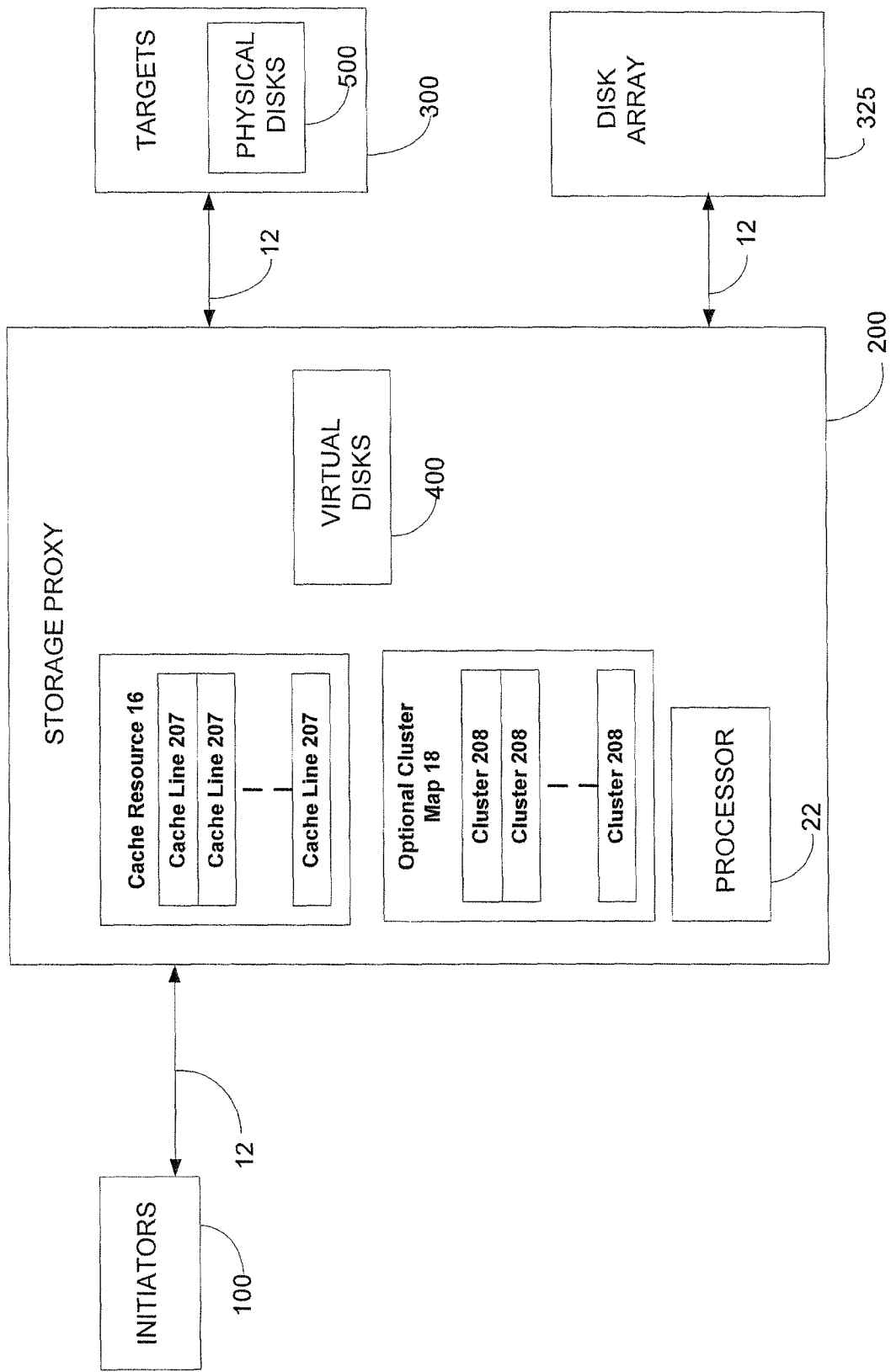
FIG. 5 depicts an example of a computer system configured to identify data clusters.

FIG. 5 depicts a computer system configured to use a cluster map to identify groups of contiguous data blocks that may have a particular association. Processor 22 may monitor the read operations from the initiator 100 and determine that groups or "clusters" of contiguous data blocks are associated. For example, the processor 22 may determine that a particular cluster of data blocks is accessed sequentially or may determine that a particular cluster of data blocks are accessed around the same time.

The processor 22 identifies the address range and other state information for a cluster 208 of data blocks and then monitors subsequent read operations from initiator 100. If the address of a read request comes within one of the address ranges associated with one of the clusters 208, the processor 22 may load the entire cluster of contiguous data blocks from physical disks 500 into cache resource 16. Generating and using the cluster map 18 is described in more detail in U.S. patent application Ser. No. 12/814,438 filed on Jun. 12, 2010; Ser. No. 12/605,119 filed on Oct. 23, 2009; and Ser. No. 12/605,160 filed on Oct. 23, 2009 and are all incorporated by reference in their entireties.

Multiple different types of memory may exist in the overall computing system. For example, target 300 may include flash discs and other relatively slower disks 325, such as rotating disks in a disk array. In one example, processor 22 may more likely load data from the slow disks 325 into the cache resource 16 since the slow disks may have a relatively slower access time and possibly higher access time profitability when loaded into cache resource 16 compared with data contained in faster flash disks.

Figure 6:
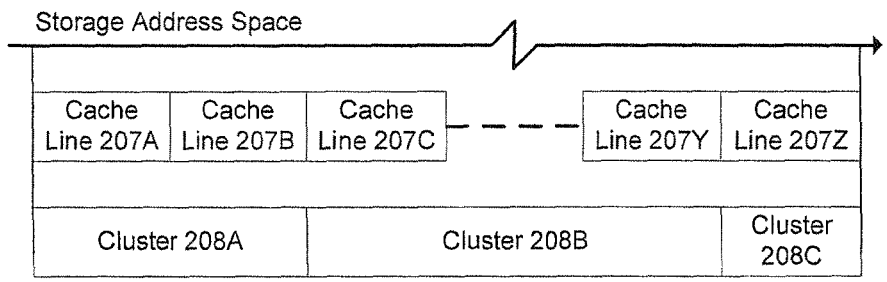
FIG. 6 depicts an example of a mapping of cache lines with clusters.

FIG. 6 depicts an example of a mapping between cache lines 207 and clusters 208. A first group of cache lines 207A and 207B are associated with a cluster 208A, a second group of cache lines 207C-207Y are associated with a cluster 208B, and a third cache line 207Z is associated with a cluster 208C. Processor 22 in FIG. 6 associates the cache lines 207 with clusters 208, such as described in the above referenced patent applications that have been incorporated by reference.

In one example, clusters 208 and cache lines 207 may be associated with different block sizes. For example, the address block size for a cache line 207 may be 4 kilobytes (KB) and the clusters 208 may be various 4 KB block sizes, such as 4 KB, 8 KB, 12 KB, etc. In another example, the block sizes for clusters 208 may not necessarily be delineated on cache line boundaries.

Figure 7:
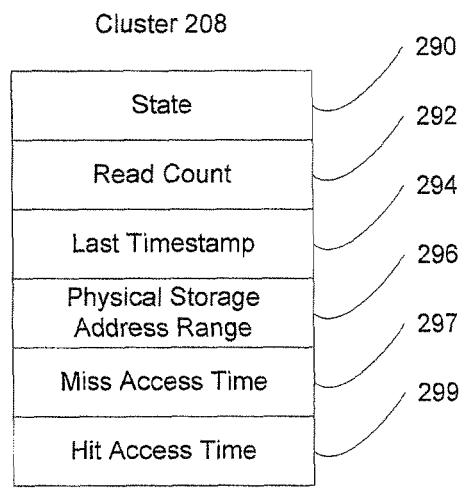
FIG. 7 depicts an example of a cluster table.

FIG. 7 shows a table containing information associated with a particular cluster 208. Similar to the cache lines 207, the information for clusters 208 may be contained in memory, registers, buffers, or any other storage element in the storage proxy 200. The state information 290 may identify a state of the cluster 208, such as valid, invalid, or previously valid. The read count 292 may indicate the number of times data associated with the cluster 208 has been read within some previous time period.

In one embodiment, all of the cache lines 207 associated with a particular cluster 208 may have the same number of reads. For example, an algorithm used to derive the clusters 208 may be based on cache lines 207 having the same number of reads. In this embodiment, the processor 22 can obtain the read count value 292 from any of the cache line read count values 212 associated with that cluster 208 as shown in FIG. 2. However, other schemes may create clusters of cache lines 207 with different read count values. In these embodiments, the read count value 292 may be an average, minimum, or maximum of the read count values 212 for the group of cache lines 207 associated with the cluster 208.

The cluster last timestamp value 294 indicates a time of a most recently accessed one of the cache lines 207 associated with that particular cluster 208. For example, the processor 22 may determine the last timestamp value 294 as the most recent timestamp value 214 in FIG. 2 for any of the cache lines associated with the cluster 208.

The physical storage address range 296 contains the address range for the group of cache lines 207 associated with a particular cluster 208. For example in FIG. 6, the cluster 208B has a physical storage address range 296 that starts at the address associated with cache line 207C and ends at the address 278 associated for cache line 207Y. The last timestamp value 294 for cluster 208B will be the last timestamp value 214 for cache lines 207C-207Y that was last read by storage proxy 200 pursuant to a read request from initiator 100.

The physical storage address range 296 may be contiguous and any cluster 208 that is determined suitable for uploading may be read without the risk of wasting space on intervening unsuitable cache lines (such as would be the case for a non-cluster driven approach).

A miss access time 297 indicates an amount of time associated with a cache miss for the cluster and a cluster hit access time 299 indicates an amount of time associated with a cache hit for the cluster. For example, initiator 100 may send a read request to storage proxy 200 having an associated address. The processor 22 in storage proxy 200 determines if the address is within an address range for one of the clusters 208.

A cache hit is identified when the address of the read request is within the physical storage address range 296 for one of the clusters 208 contained in cache resource 16. Storage proxy 200 may then provide the associated data from the cache resource 16 to the initiator 100 in response to the read request. The hit access time 299 is based on an amount of time required to access the data in cache resource 16.

A cache miss is identified when the address of the read request is not within storage address range 296 for one of the clusters 208 contained in cache resource 16. Storage proxy 200 may then provide the associated data from the physical disks 500 to the initiator 100 in response to the read request. Miss access time 297 is based on an amount of time required to access data in physical disks 500 in response to the cache miss.

A variety of different schemes could be used by the processor 22 for calculating the miss access time 297 and the hit access time 299. For example, the processor 22 may average all miss access times associated with a particular cluster 208. For example, a first cache miss associated with a particular cluster may be 10 milliseconds (ms) and a second cache miss associated with the same cluster may be 6 ms. The miss access time 297 for the cluster 208 may be calculated by the processor 22 to be (10+6)/2=8 ms.

Similarly, processor 22 may derive hit access time 299 by averaging all cache hit access times associated with a particular cluster 208. For example, a first cache hit associated with a cluster may be 10 microseconds (μs), a second cache hit associated with the same cluster may be 30 μs, and a third cache hit associated with the same cluster may be 20 μs. The hit access time 299 may be calculated by processor 22 as (10+30+20)/3=20 μs.

Processor 22 may store the average miss access time 297 and average hit access time 299 and store a separate number of accesses associated with the cluster 208. An additional hit or miss could then be averaged into the hit or miss access time by multiplying the current average access time by the current number of accesses, adding the new access time to the sum, and then dividing the sum by the new incremented total number of accesses.

The hit and miss access times may be derived by processor 22 according to any relative time reference such as from when the storage access request is first received by the storage proxy 200 from the initiator 100 to when the data associated with the storage access request is sent from storage proxy 200 back to the initiator 100. Other reference times may also be used by the processor 22, such as an amount of time from when the read request is first sent to the cache resource 16 or target 300 until when the data is received back from the cache resource 16 or target 300, respectively.

Figure 8:
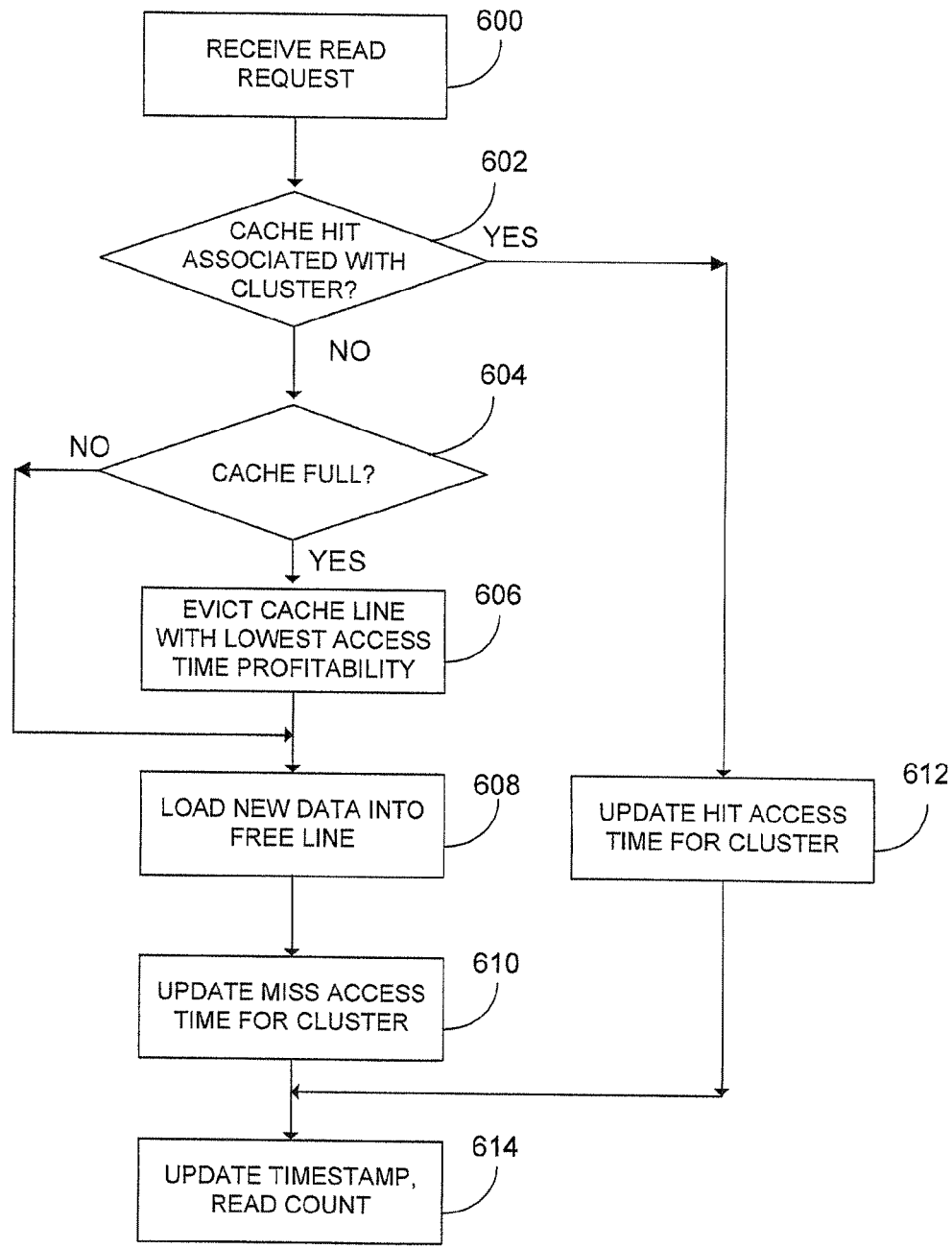
FIG. 8 depicts an example of a process for evicting data from cache lines according to access time profitability.

FIG. 8 depicts an example of a process for evicting cache lines according to a least profitability used (LPU) scheme. In operation 600, the storage proxy may receive a read request from the initiator. In operation 602, the storage proxy determines if there is a cache hit associated with the cluster. For example, the storage proxy determines if the cache hit is within the address range 296 for one of the clusters 208. When there is cache hit, the storage proxy in operation 612 updates the hit access time 299 associated with the cluster 208, such as deriving a new average hit access time for the cluster.

The storage proxy may determine that there is no cache hit for the cluster in operation 602 and may determine the cache is full in operation 604. For example, the storage proxy may determine all or most of the cache lines 207 in the cache resource 16 are valid.

When all or most of the cache lines are full in operation 604, the storage proxy may evict one or more of the cache lines with lowest access time profitability in operation 606. For example, the storage proxy may determine access time profitability values for each cluster of cache lines according to the miss access time 297 and hit access time 299. The storage proxy may then invalidate the cache lines with the lowest access time profitability values by setting an invalidation flag in the cache line state information. When the read request is within the physical storage address range 296 of a cluster, the storage device may evict enough cache lines 207 to store the entire cluster in cache resource 16. The cache lines also may be preemptively evicted prior to the cache resource actually filling up, such as based on a rate of storage access requests received by the storage proxy and/or based on a remaining available capacity in the cache resource.

After the cache line eviction in operation 606, data is read from physical disks 500 and loaded into the evicted or cache lines in operation 608. When the cache is not full in operation 604, the data from physical disks 500 may be located into the unused cache lines in operation 608.

In operation 610, the storage proxy may update the miss access time 297 associated with the cluster. For example, the storage proxy may derive and/or update the average miss access time for reading the data associated with the cluster from the physical disks 500. The read count 292 and last timestamp value 294 may be updated in operation 614.

The cluster based access time profitability eviction scheme in FIG. 8 may be used in combination any of the caching schemes described in FIGS. 3 and 4. Any individual cache line 207 may be treated as an individual cluster as shown by cluster 208C in FIG. 6. For addresses not associated with a cluster, the storage proxy may update the cache line miss access time 218 in FIG. 2.

Figure 9:
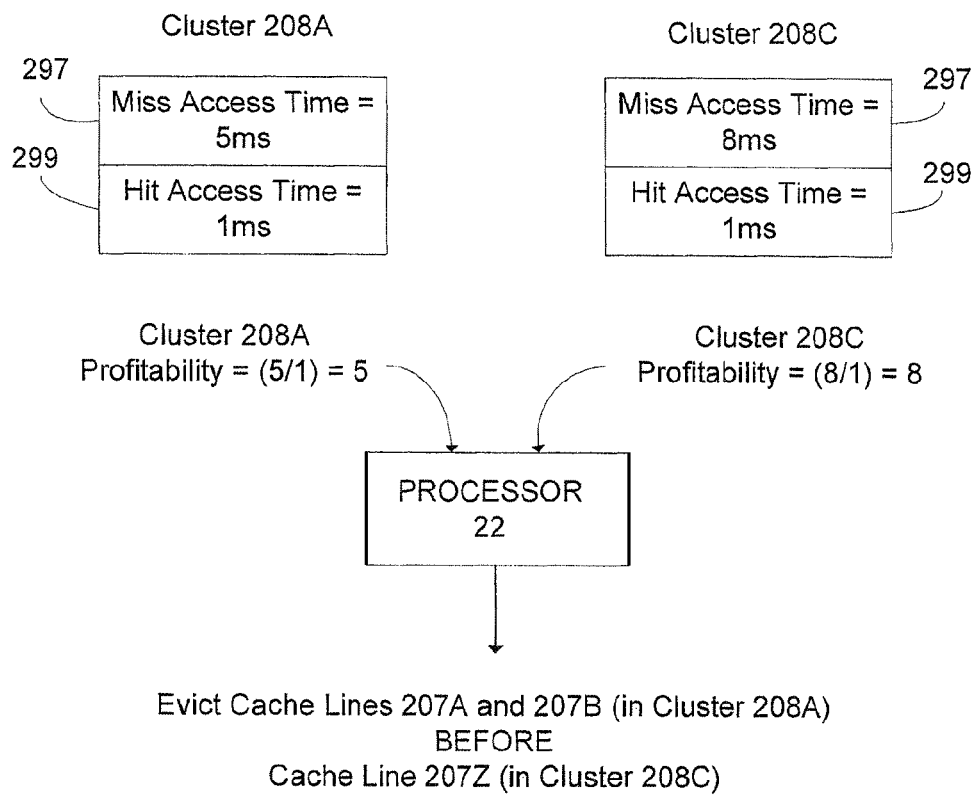
FIG. 9 depicts an example of a computer system configured to identify a lowest access time profitability cache line.

FIG. 9 depicts one example of how the storage proxy determines lowest access time profitability in operation 606 in FIG. 8. Referring to FIGS. 5-9, the cluster 208A may have an average miss access time 297 of 5 ms and an average hit access time 299 of 1 ms. The cluster 208C may have an average miss access time 297 of 8 ms and an average hit access time 299 of 1 ms.

Processor 22 in may determine an access time profitability value for the cluster 208A as 5/1=5 and may determine an access time profitability value for the cluster 208C as 8/1=8. The processor 22 may determine that cluster 208C has a higher access time profitability in the cache resource 16 than cluster 208A. For example, both clusters 208A and 208C have the same hit access time of 1 ms. However, a cache miss for cluster 208C has an average miss access time of 8 ms while a cache miss for cluster 208A only has an average miss access time of 5 ms.

Thus, between cluster 208A and cluster 208C, the access times provided through storage proxy 200 may be improved/reduced more by evicting the data in cache resource 16 associated with cluster 208A before evicting the data in cache resource 16 associated with cluster 208C. Accordingly, processor 22 in operation 606 in FIG. 8 may evict/invalidate the data in cache lines 207A and 207B for cluster 208A before evicting cache line 207Z associated with cluster 208C.

As with all caching technology, the concept of a full cache need not apply only to the situation where every cache resource (line) is being used. Some cache designs (set-associative for example) can use a specific cache resource only for a subset of actual data. The specific subset may be based on address range, low-order bits of the address or other considerations. In such a case, the cache may be considered full when an eviction of existing data is required to store new data regardless of the actual physical utilization of the aggregate caching resources.

It should be understood that FIG. 9 shows only one example of how the access time profitability value may be determined. In other embodiments, the comparison of the miss access time with hit access time may also be weighted by the read count 292 and/or the last timestamp 294. For example, an access time profitability value may be multiplied by the associated read count 292 to determine an additional profitability impact factor of the cache hits and cache misses. In another example, only the miss access times or hit access times may be used to derive the access time profitability values.

The access time profitability value can also be weighted differently for different boundaries. For example a lookup table may be used to assign a first weighting value to the access time profitability values for a first read count range and assign a second weighting value to the access time profitability values for a second read count range. The read count ranges for each weighting do not necessarily have to be linear. Further, the weightings and/or weighting threshold ranges may be dynamically modified based on monitoring overall average access times provided by through the storage proxy and adjusting the weightings and/or thresholds according to the overall average access times.

Hardware and Software

Several examples have been described above with reference to the accompanying drawings. Various other examples are also possible and practical. The systems and methodologies may be implemented or applied in many different forms and should not be construed as being limited to the examples set forth above. Some systems described above may use dedicated processor systems, micro controllers, programmable logic devices, or microprocessors that perform some or all of the operations. Some of the operations described above may be implemented in software or firmware and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Digital Processors, Software and Memory Nomenclature

As explained above, embodiments of this disclosure may be implemented in a digital computing system, for example a CPU or similar processor. More specifically, the term "digital computing system," can mean any system that includes at least one digital processor and associated memory, wherein the digital processor can execute instructions or "code" stored in that memory. (The memory may store data as well.)

A digital processor includes but is not limited to a microprocessor, multi-core processor, Digital Signal Processor (DSP), Graphics Processing Unit (GPU), processor array, network processor, etc. A digital processor (or many of them) may be embedded into an integrated circuit. In other arrangements, one or more processors may be deployed on a circuit board (motherboard, daughter board, rack blade, etc.). Embodiments of the present disclosure may be variously implemented in a variety of systems such as those just mentioned and others that may be developed in the future. In a presently preferred embodiment, the disclosed methods may be implemented in software stored in memory, further defined below.

Digital memory, further explained below, may be integrated together with a processor, for example Random Access Memory (RAM) or FLASH memory embedded in an integrated circuit Central Processing Unit (CPU), network processor or the like. In other examples, the memory comprises a physically separate device, such as an external disk drive, storage array, or portable FLASH device. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such a conventional rotating disk drive. All such memories are "machine readable" in that they are readable by a compatible digital processor. Many interfaces and protocols for data transfers (data here includes software) between processors and memory are well known, standardized and documented elsewhere, so they are not enumerated here.

Storage of Computer Programs

As noted, some embodiments may be implemented or embodied in computer software (also known as a "computer program" or "code"; we use these terms interchangeably). Programs, or code, are most useful when stored in a digital memory that can be read by one or more digital processors. The term "computer-readable storage medium" (or alternatively, "machine-readable storage medium") includes all of the foregoing types of memory, as well as new technologies that may arise in the future, as long as they are capable of storing digital information in the nature of a computer program or other data, at least temporarily, in such a manner that the stored information can be "read" by an appropriate digital processor. The term "computer-readable" is not intended to limit the phrase to the historical usage of "computer" to imply a complete mainframe, mini-computer, desktop or even laptop computer. Rather, the term refers to a storage medium readable by a digital processor or any digital computing system as broadly defined above. Such media may be any available media that is locally and/or remotely accessible by a computer or processor, and it includes both volatile and non-volatile media, removable and non-removable media, embedded or discrete.

Having described and illustrated a particular example system, it should be apparent that other systems may be modified in arrangement and detail without departing from the principles described above. Claim is made to all modifications and variations coming within the spirit and scope of the following claims

The invention claimed is:

1. An apparatus, comprising:
cache lines configured to store copies of data from a storage device; and
logic circuitry configured to derive hit access times and miss access times for the cache lines, wherein the hit access times are derived based on access times for the cache lines and the miss access times are derived based on access times for the storage device.

2. The apparatus of claim 1 wherein the logic circuitry is configured to replace the data in the cache lines with other data from the storage device according to the hit access times and miss access times.

3. The apparatus of claim 1 wherein the logic circuitry is configured to identify ratios between the hit access times and the miss access times associated with a cache line of the cache lines.

4. The apparatus of claim 3 wherein the logic circuitry is further configured to:
identify a high access time profitability cache line of the cache lines as having larger differences between the associated miss access times and associated hit access times and a low access time profitability cache line of the cache lines as having smaller differences between the associated miss access times and associated hit access times; and
replace the data in the low access time profitability cache lines before replacing the data in the high access time profitability cache lines.

5. The apparatus of claim 4 wherein the logic circuitry is further configured to:
receive a read request;
determine the data associated with the read request is located in the storage device and not located in the cache lines;
invalidate at least some of the low profitability access time cache lines in response to the cache lines being substantially full; and
replace the invalidated low profitability access time cache lines cache lines with the data in the storage device associated with the read request.

6. The apparatus of claim 1 wherein the logic circuitry is configured to identify address ranges associated with blocks of data, wherein at least some of the address ranges are associated with multiple cache lines and at least some of the hit access times and miss access times are associated with the address ranges.

7. The apparatus of claim 6 wherein the logic circuitry is configured to:
receive read requests;
identify read addresses in the read requests;
identify the address ranges containing the read addresses;
identify new hit access times for the identified address ranges when the read addresses are associated with data in the cache lines; and
identify new miss access times for the identified address ranges when the read addresses not associated with data in the cache lines.

8. The apparatus according to claim 7 wherein the logic circuitry is configured to average the new hit access times with the hit access times associated with the identified address ranges and average the new miss access times with the hit access times associated with the samo identified address ranges.

9. The apparatus of claim 6 wherein the logic circuitry is further configured to:
compare the hit access times with the miss access times associated with the address ranges;
identify access time profitability values for the address ranges based on the comparisons;
identify one of the address ranges having a lowest one of the access time profitability values; and
replacing the data in all of the cache lines associated with the identified one of the address ranges.

10. A method, comprising:
providing a cache memory;
providing a processor, configured to perform the steps of:
   storing data from a storage device in cache lines;
   receiving storage access requests;
   identifying access times for servicing the storage access requests;
   associating the access times with the cache lines;
   deriving access time profitability values for the cache lines based on the associated access times; and
   replacing data in the cache lines with data from the storage device based on the access time profitability values.

11. The method of claim 10 wherein the access times comprise hit access times for accessing the cache lines when the data associated with the storage access requests is located in the cache lines and miss access times for accessing the storage device when the data associated with the storage access requests is not located in the cache lines.

12. The method of claim 11 wherein deriving the access time profitability factors comprise deriving a ratio between the hit access times and miss access times associated with the same-cache lines.

13. The method of claim 10 further comprising:
receiving new storage access requests;
identifying new access times for the storage access requests;
associating the new access times with the cache lines;
updating the access time profitability values for the cache lines based on the new access times associated with the cache lines; and
replacing data in the cache lines with data from the storage device according to the updated access time profitability values.

14. The method of claim 13 wherein updating the access time profitability values comprises averaging the new access times with the access times associated with the cache lines.

15. The method of claim 10 wherein replacing the data in the cache lines comprises replacing the data in the cache lines with lower access time profitability values before replacing the data in the cache lines with higher access time profitability values.

16. The method of claim 10, further comprising:
identifying read count values for the cache lines;
identifying last read timestamp values for the cache lines; and
replacing data in the cache lines based on the read count values and/or the last read timestamp values for the cache lines.

17. The method of claim 10, comprising:
identify clusters of data having associated address ranges;
storing at least some of the clusters of data into multiple cache lines;
associating the access times with the clusters of data;
deriving the access time profitability values for the clusters of data; and
replacing the clusters of data in the cache lines based on the access time profitability values for the clusters of data.

18. The method of claim 17 further comprising:
identifying data access patterns for the storage access requests;
determining new address ranges for at least some of the clusters of data according to the data access patterns; and
identify new access times for the clusters of data with the new address ranges.

19. A storage proxy, comprising:
a cache resource including cache lines; and a processor configured to:
load the cache lines with data from a storage device;
receive storage access requests from an initiator directed to the storage device;
provide the data from the cache lines in response to identifying cache line hits for the storage access requests;
provide the data from the storage device in response to identifying cache line misses for the storage access requests;
identify hit access times for the cache lines in response to the cache line hits;
identify miss access times for the storage device in response to the cache line misses; and
replace the data in the cache lines with other data from the storage devices based on the hit access times and the miss access times.

20. The storage proxy of claim 19 wherein the hit access times and miss access times are associated with the cache lines and the data in the cache lines is replaced according to comparisons between the hit access times and miss access times associated with the same cache lines.

21. The storage proxy of claim 19, wherein the cache lines include a miss access time counter and a hit access time counter.

22. The storage proxy of claim 19 further comprising a cluster map configured to identify address ranges for blocks of data.

23. The storage proxy of claim 22 wherein at least some of the miss access times and hit access times are associated with the address ranges.

24. The storage proxy of claim 23 wherein the processor is further configured to:
receive new storage access requests;
identify new hit access times for the cache lines in response to cache line hits for the new storage access requests;
combine the new hit access times with the hit access times previously identified for the same cache lines;
identify new miss access times for the storage device in response to cache line misses for the new storage access requests; and
combine the new miss access times with the miss access times associated with the cache lines.

25. The storage proxy of claim 23 wherein the processor is further configured to average the new hit access times with the hit access times previously identified for the same cache lines and average the new miss access times with the miss access times previously associated with the cache lines.

* * * * *